US012078958B2

(12) United States Patent
Yamazaki et al.

(10) Patent No.: US 12,078,958 B2
(45) Date of Patent: Sep. 3, 2024

(54) IMAGE FORMING APPARATUS

(71) Applicant: KYOCERA Document Solutions Inc., Osaka (JP)

(72) Inventors: Hiroshi Yamazaki, Osaka (JP); Junichi Nakagawa, Osaka (JP); Tamotsu Shimizu, Osaka (JP); Kenichi Tamaki, Osaka (JP); Takuji Watanabe, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/332,249

(22) Filed: Jun. 9, 2023

(65) Prior Publication Data

US 2023/0408975 A1 Dec. 21, 2023

(30) Foreign Application Priority Data

Jun. 16, 2022 (JP) ................................ 2022-097209

(51) Int. Cl.
*G03G 21/20* (2006.01)

(52) U.S. Cl.
CPC ................................ *G03G 21/206* (2013.01)

(58) Field of Classification Search
CPC ............................ G03G 21/20; G03G 21/206
USPC ............................................ 399/91, 93, 119
See application file for complete search history.

(56) References Cited

FOREIGN PATENT DOCUMENTS

| | | | |
|---|---|---|---|
| JP | 2008-145826 A | | 6/2008 |
| JP | 2015-022054 | * | 2/2015 |

* cited by examiner

*Primary Examiner* — Hoan H Tran
(74) *Attorney, Agent, or Firm* — Stein IP, LLC

(57) ABSTRACT

Provided is an image forming apparatus that is capable of carrying out a scattered-toner recovery mode in which, while image formation is prevented from being performed, scattered toner that has dropped from a filter and adhered to an outer peripheral surface of a developer carrying member is recovered by a cleaning unit through intermediation of an image bearing member. A fixed magnet of the developer carrying member has a first pole that faces the image bearing member, a second pole that faces the filter, and an intermediate pole between the first pole and the second pole.

6 Claims, 5 Drawing Sheets

IMAGE FORMING APPARATUS

INCORPORATION BY REFERENCE

This application is based on and claims the benefit of priority from Japanese Patent Application No. 2022-097209 filed on Jun. 16, 2022, the contents of which are hereby incorporated by reference.

BACKGROUND

The present disclosure relates to an image forming apparatus.

In widely-used electrophotographic image-forming apparatuses such as a copying machine and a printer, toner is supplied onto an electrostatic latent image formed on an outer peripheral surface of an image bearing member such as a photosensitive drum, and then the electrostatic latent image is developed. In this way, a toner image to be transferred onto sheets is formed. In order to continuously form uniform images, the image forming apparatuses cause developer that is contained in a developing container and that contains the toner to be stirred and conveyed in the developing container.

Such related-art image forming apparatuses have a risk that the toner scatters from an inside to an outside of the developing container, and that insides of the apparatuses are fouled with the scattered tonner.

SUMMARY

According to an aspect of the present disclosure, there is provided an image forming apparatus including: an image bearing member; a charging unit; a cleaning unit; a developing device; a voltage application section; and a control section.

The image bearing member has an outer peripheral surface on which an electrostatic latent image is formed.

The charging unit is configured to charge the outer peripheral surface of the image bearing member.

The cleaning unit is configured to clean the outer peripheral surface of the image bearing member.

The developing device includes a developing container, a developer conveying member, and a developer carrying member.

The developing container is configured to contain developer that contains toner to be supplied to the image bearing member.

The developer conveying member is supported in a conveying chamber of the developing container in a manner that allows the developer conveying member to rotate, and is configured to circulate the developer by stirring and conveying the developer.

The developer carrying member is supported in the developing container in a manner that allows the developer carrying member to rotate while the developer carrying member faces the image bearing member, and is configured to supply the toner in the conveying chamber to the image bearing member.

The voltage application section is configured to apply developing voltage to the developer carrying member.

The control section is configured to control the image bearing member, the charging unit, the cleaning unit, the developing device, and the voltage application section.

The developing device includes a toner trapping mechanism that includes a duct, a filter, an exhaust fan, and a vibration generating unit.

The duct is connected to the conveying chamber, and is configured to allow air in the conveying chamber to flow through the duct.

The filter is arranged at a portion where the duct and the conveying chamber are connected to each other above the developer carrying member, and is configured to trap the toner that flows from the conveying chamber into the duct.

The exhaust fan is configured to cause the air in the conveying chamber to flow out to an outside through the duct.

The vibration generating unit is configured to vibrate the filter.

The control section is capable of carrying out a scattered-toner recovery mode in which, while image formation is prevented from being performed, scattered toner that has dropped from the filter and adhered to an outer peripheral surface of the developer carrying member is recovered by the cleaning unit through intermediation of the image bearing member by causing, by the control section, the vibration generating unit to vibrate the filter, by causing, by the control section, the charging unit and the voltage application section to cause a potential difference in a direction in which the toner is moved from the developer carrying member to the image bearing member, by causing, by the control section, the developer carrying member to rotate in a direction reverse to a direction at a time of the image formation, and by causing, by the control section, the image bearing member to rotate in a same direction as a direction at the time of the image formation.

The developer carrying member includes a developing sleeve and a fixed magnet.

The developing sleeve has a hollow cylindrical shape, is rotatable, and is configured to carry the developer on an outer peripheral surface of the developing sleeve.

The fixed magnet is fixed in the developing sleeve in a manner that prevents the fixed magnet from rotating, and has a plurality of magnetic poles that are arrayed along a circumferential direction of the developing sleeve.

The plurality of magnetic poles includes, in the rotation direction of the developing sleeve, a first pole that is arranged in an area where the developer carrying member faces the image bearing member, a second pole that is arranged in an area where the developer carrying member faces the filter, and an at least one intermediate pole that is arranged between the first pole and the second pole.

The first pole and the second pole have a same polarity.

The at least one intermediate pole includes an odd number of intermediate poles that are arranged in a manner that a polarity of the at least one intermediate pole which is adjacent to the first pole and the second pole is opposite to the same polarity of the first pole and the second pole, and that polarities of the odd number of intermediate poles which are adjacent to each other are opposite to each other.

DETAILED DESCRIPTION

Now, an embodiment of the present disclosure is described with reference to the drawings. Note that, the present disclosure is not limited to the following content.

Figure 1:
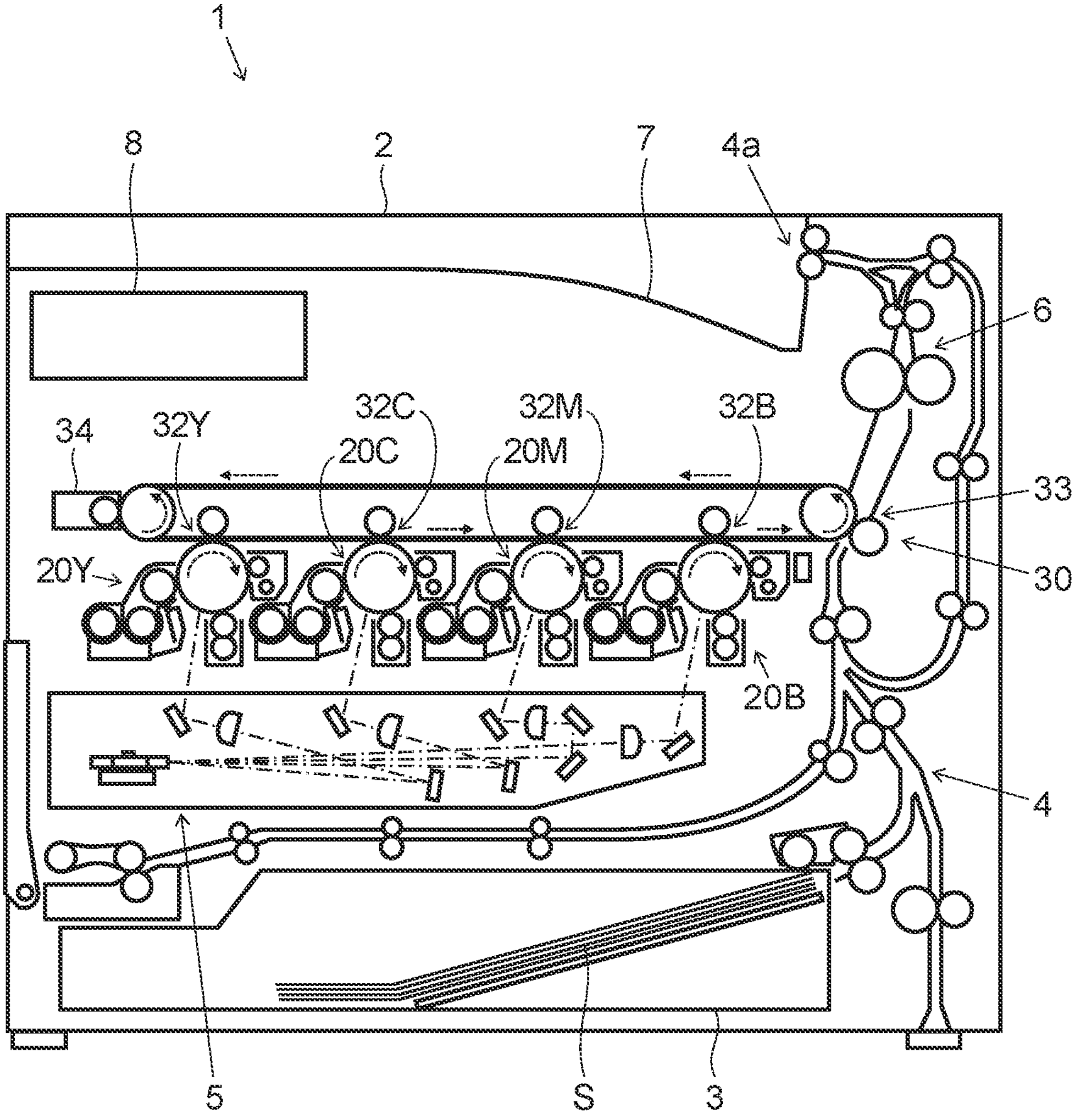
FIG. 1 is a schematic cross-sectional front view of an image forming apparatus according to an embodiment of the present disclosure.
Figure 2:
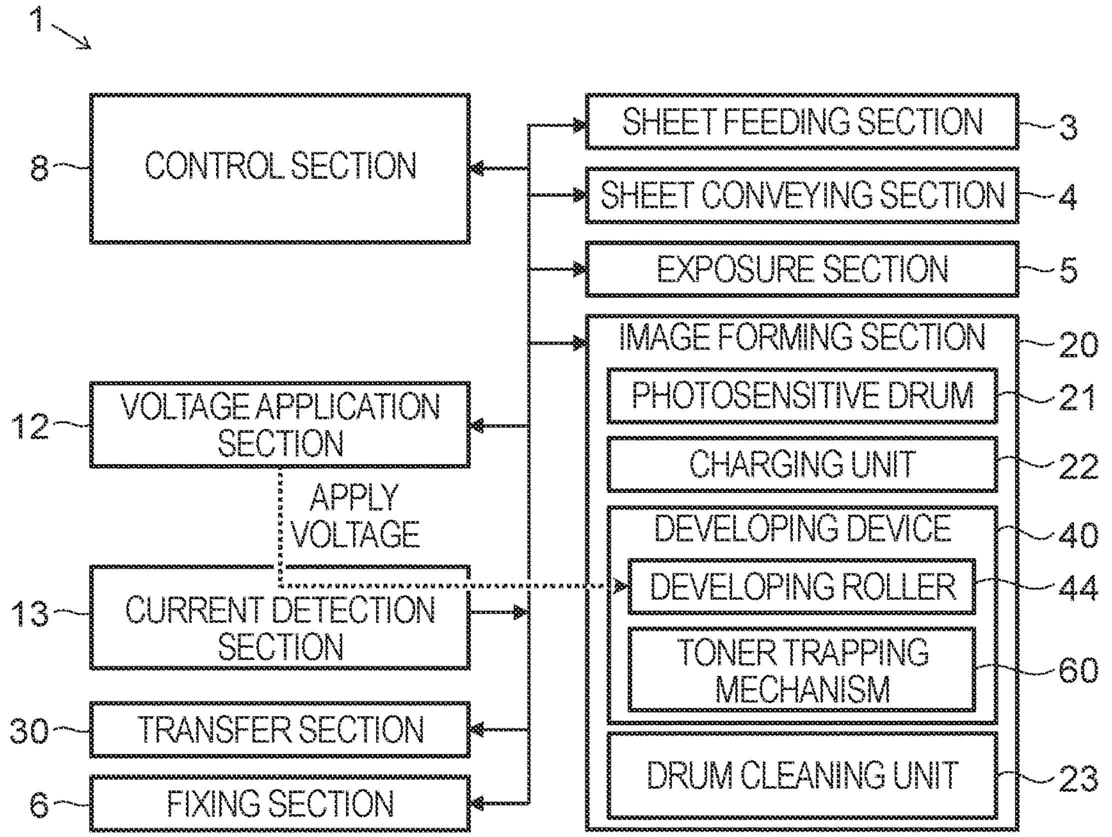
FIG. 2 is a block diagram showing a configuration of the image forming apparatus in FIG. 1.
Figure 3:
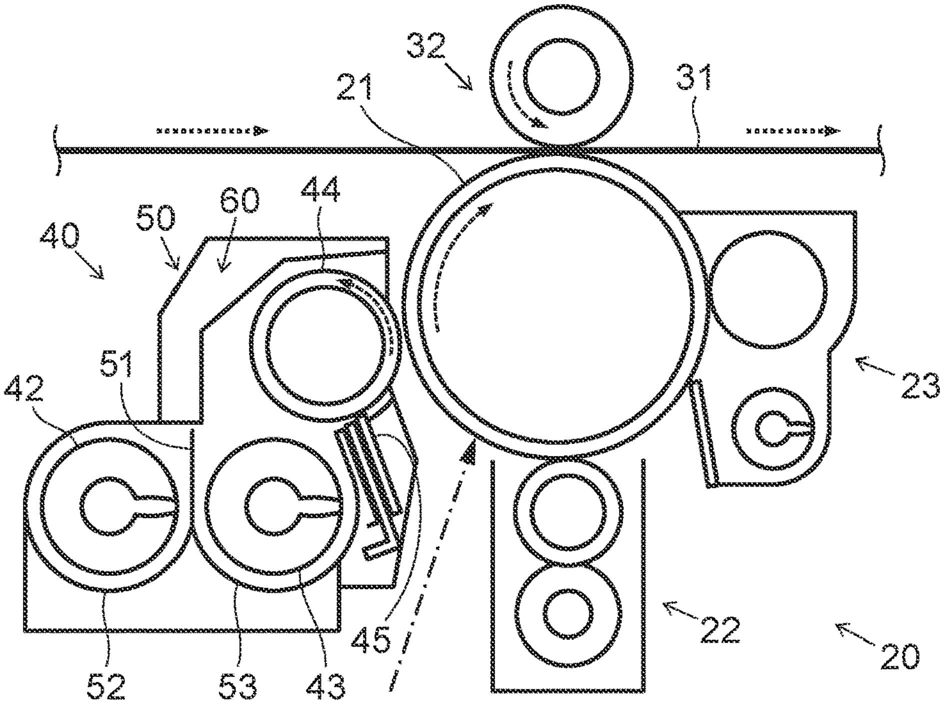
FIG. 3 is a schematic cross-sectional front view of a vicinity of an image forming section of the image forming apparatus in FIG. 1.

FIG. 1 is a schematic cross-sectional front view of an image forming apparatus 1 according to the embodiment. FIG. 2 is a block diagram showing a configuration of the image forming apparatus 1 in FIG. 1. FIG. 3 is a schematic cross-sectional front view of a vicinity of an image forming section 20 of the image forming apparatus 1 in FIG. 1. The image forming apparatus 1 according to this embodiment is, for example, a tandem color printer that transfers toner images onto sheets S with use of an intermediate transfer belt 31. The image forming apparatus 1 may be, for example, what is called a multifunction peripheral having functions such as printing, scanning (image reading), and facsimile transmission.

As shown in FIG. 1, FIG. 2, and FIG. 3, the image forming apparatus 1 has a body 2 including a sheet feeding section 3, a sheet conveying section 4, an exposure section 5, the image forming section 20, a transfer section 30, a fixing section 6, a sheet delivery section 7, and a control section 8.

The sheet feeding section 3 is arranged in a bottom portion of the body 2. The sheet feeding section 3 stores the plurality of unprinted sheets S, and sends out the sheets S one by one at a time of printing. The sheet conveying section 4 extends in an upper-and-lower direction along a side wall of the body 2. The sheet conveying section 4 conveys the sheets S sent out from the sheet feeding section 3 to a secondary transfer unit 33 and the fixing section 6, and delivers the sheets S after fixation onto the sheet delivery section 7 through a sheet delivery port 4*a*. The exposure section 5 is arranged above the sheet feeding section 3. The exposure section 5 applies laser beams controlled on the basis of image data to the image forming section 20.

The image forming section 20 is arranged above the exposure section 5 and under the intermediate transfer belt 31. The image forming section 20 includes an image forming section 20Y corresponding to yellow, an image forming section 20C corresponding to cyan, an image forming section 20M corresponding to magenta, and an image forming section 20B corresponding to black. These four image-forming sections 20 basically have the same structure. Thus, in the following description, unless specific description is necessary, identification symbols "Y," "C," "M," and "B" that respectively represent the colors may be omitted.

The image forming section 20 includes a photosensitive drum (image bearing member) 21 which is supported in a manner that allows the photosensitive drum 21 to rotate in a predetermined direction (clockwise in FIG. 1 and FIG. 3). The image forming section 20 further includes, around the photosensitive drum 21, a charging unit 22, a developing device 40, and a drum cleaning unit (cleaning unit) 23 that are arranged along the rotation direction. Note that, a primary transfer unit 32 is arranged between the developing device 40 and the drum cleaning unit 23.

The photosensitive drum 21 is formed into a cylindrical shape that extends in a horizontal direction, and has, on its outer peripheral surface, a photosensitive layer formed, for example, of an amorphous-silicon photosensitive member. The charging unit 22 charges the surface (outer peripheral surface) of the photosensitive drum 21 with a predetermined potential. The exposure section 5 exposes the outer peripheral surface of the photosensitive drum 21, the outer peripheral surface having been charged by the charging unit 22, thereby forming an electrostatic latent image of an original image on the outer peripheral surface of the photosensitive drum 21. The developing device 40 supplies toner onto and develops the electrostatic latent image, thereby forming a toner image. The four image-forming sections 20 each form the toner image in a corresponding one of the different colors. After the toner image has been primarily transferred onto an outer peripheral surface of the intermediate transfer belt 31, the drum cleaning unit 23 cleans off residual toner and the like from the outer peripheral surface of the photosensitive drum 21. In such a way, the image forming sections 20 forms images (the toner images) to be transferred onto the sheets S.

The transfer section 30 includes the intermediate transfer belt 31, primary transfer units 32Y, 32C, 32M, and 32B, the secondary transfer unit 33, and a belt cleaning unit 34. The intermediate transfer belt 31 is arranged over the four image-forming sections 20. The intermediate transfer belt 31 is an endless intermediate-transfer member which is supported in a manner that allows the intermediate transfer belt 31 to rotate in a predetermined direction (counterclockwise in FIG. 1), and onto which the toner images formed respectively in the four image-forming sections 20 are primarily transferred sequentially in a superimposed manner. The four image-forming sections 20 are arranged in what is called a tandem fashion, that is, are arrayed in line from an upstream side toward a downstream side in the rotation direction of the intermediate transfer belt 31.

The primary transfer units 32Y, 32C, 32M, and 32B are arranged above the image forming sections 20Y, 20C, 20M, and 20B corresponding respectively to the colors with the intermediate transfer belt 31 sandwiched therebetween. The secondary transfer unit 33 is arranged on an upstream side relative to the fixing section 6 in a sheet conveying direction of the sheet conveying section 4 and on a downstream side relative to the four image-forming sections 20Y, 20C, 20M, and 20B in the rotation direction of the intermediate transfer belt 31. The belt cleaning unit 34 is arranged on a downstream side relative to the secondary transfer unit 33 in the rotation direction of the intermediate transfer belt 31.

The primary transfer unit 32 transfers the toner image formed on the outer peripheral surface of the photosensitive drum 21 onto the intermediate transfer belt 31. Specifically, the toner images are primarily transferred onto the outer peripheral surface of the intermediate transfer belt 31 at the primary transfer units 32Y, 32C, 32M, and 32B corresponding respectively to the colors. In addition, along with rotation of the intermediate transfer belt 31, the toner images of the four image-forming sections 20 are transferred successively in the superimposed manner onto the intermediate transfer belt 31 at predetermined timings. With this, a color toner image in which the toner images in the four colors of yellow, magenta, cyan, and black are superimposed on each other is formed on the outer peripheral surface of the intermediate transfer belt 31.

The color toner image on the outer peripheral surface of the intermediate transfer belt 31 is transferred onto the sheets S at a secondary-transfer nip unit, that is, at the secondary transfer unit 33, the sheets S having been sent in synchronization by the sheet conveying section 4. The belt cleaning unit 34 cleans off deposit such as residual toner on the outer peripheral surface of the intermediate transfer belt 31 after the secondary transfer. In such a way, the transfer section 30 transfers (records) the toner images that have been formed on the outer peripheral surfaces of the photosensitive drums 21 onto the sheets S.

The fixing section 6 is arranged above the secondary transfer unit 33. The fixing section 6 fixes the toner images onto the sheets S by heating and pressing the sheets S on which the toner images have been transferred.

The sheet delivery section 7 is arranged above the transfer section 30. The sheets S that have been printed through the fixation of the toner images are conveyed to the sheet delivery section 7. The sheet delivery section 7 allows the printed sheets (printed matters) S to be taken out from above.

The control section 8 includes a CPU, an image processing unit, a storage unit, and other electronic circuits and electronic components (none of which is shown). The CPU controls operations of the components provided in the image forming apparatus 1 on the basis of control programs and data stored in the storage unit, thereby executing processes relating to functions of the image forming apparatus 1. The sheet feeding section 3, the sheet conveying section 4, the exposure section 5, the image forming section 20, the transfer section 30, and the fixing section 6 receive commands individually from the control section 8, and print the sheets S in conjunction with each other. The storage unit is constituted by a combination of non-volatile storage devices such as a program ROM (Read Only Memory) and a data ROM, and a volatile storage device such as a RAM (Random Access Memory).

In addition, as shown in FIG. 2, the image forming apparatus 1 further includes a voltage application section 12 and a current detection section 13.

The voltage application section 12 includes a power source unit and a control circuit (none of which is shown). The voltage application section 12 is electrically connected to a developing roller (developer carrying member) 44 described below of the developing device 40. The voltage application section 12 applies developing voltage to the developing roller 44. The control section 8 causes the voltage application section 12 to control timing of the application of the developing voltage to the developing roller 44, a value and a polarity of the voltage, duration of the application, and the like.

The current detection section 13 detects current that flows between the photosensitive drum 21 and the developing roller 44 at a time when the developing voltage is applied to the developing roller 44. The control section 8 receives, from the current detection section 13, information about the current that the current detection section 13 has detected.

Figure 4:
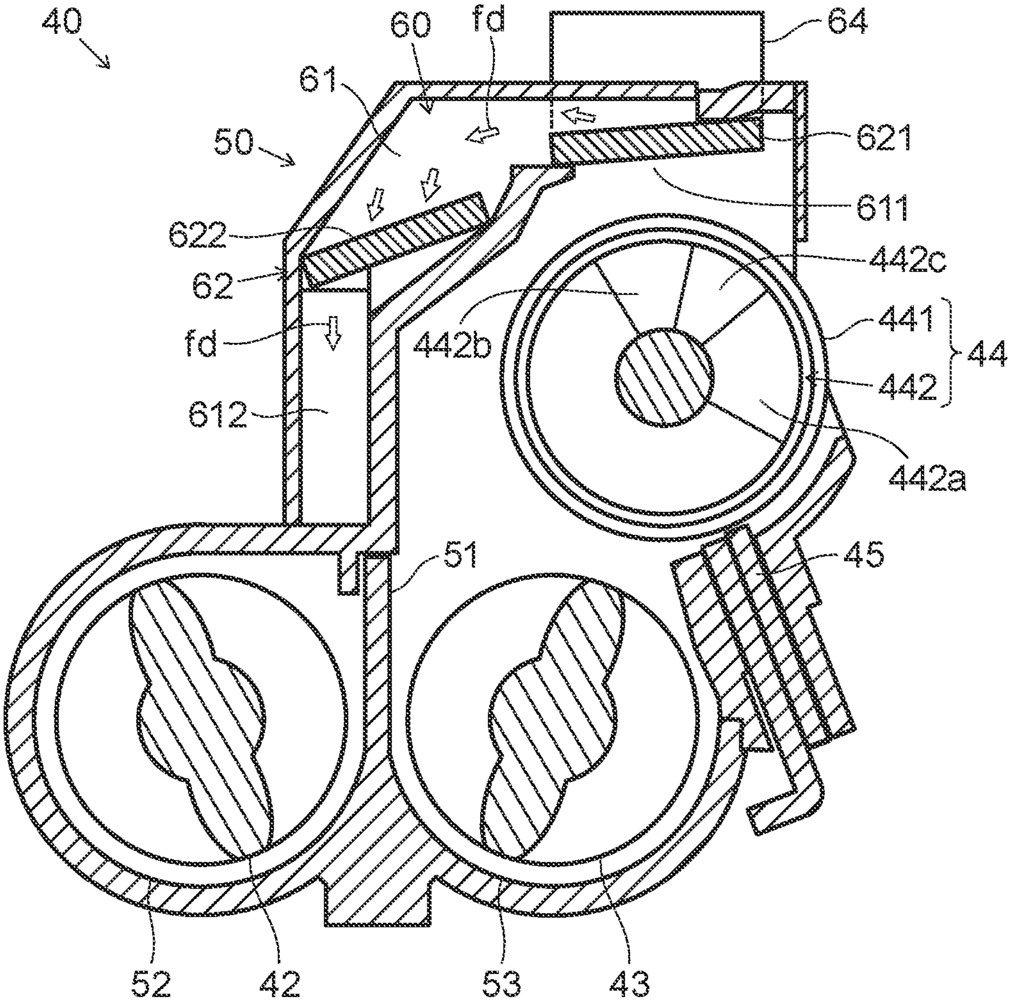
FIG. 4 is a perpendicular cross-sectional front view of a developing device of the image forming section in FIG. 3.
Figure 5:
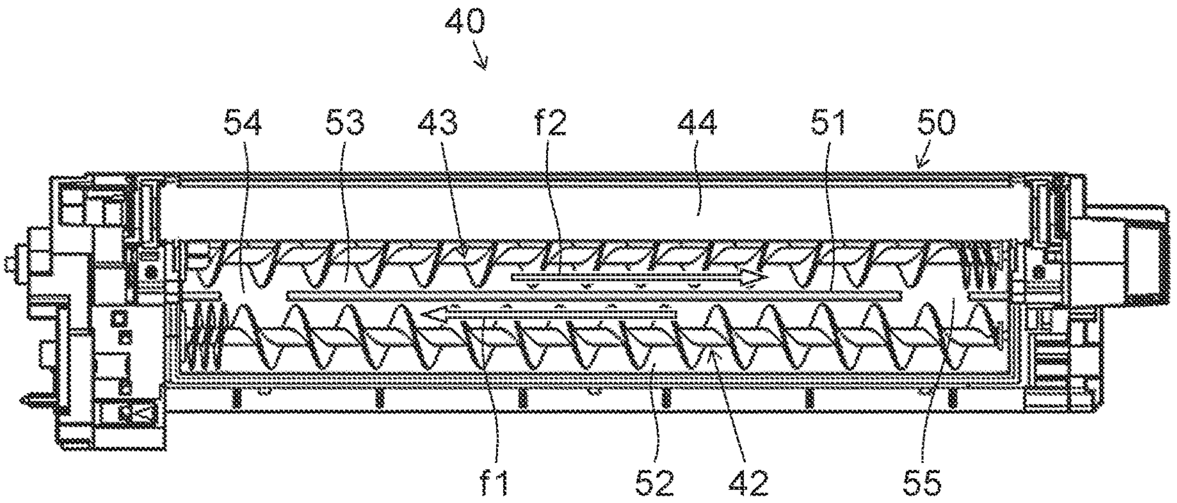
FIG. 5 is a horizontal cross-sectional plan view of the developing device of the image forming section in FIG. 3.
Figure 6:
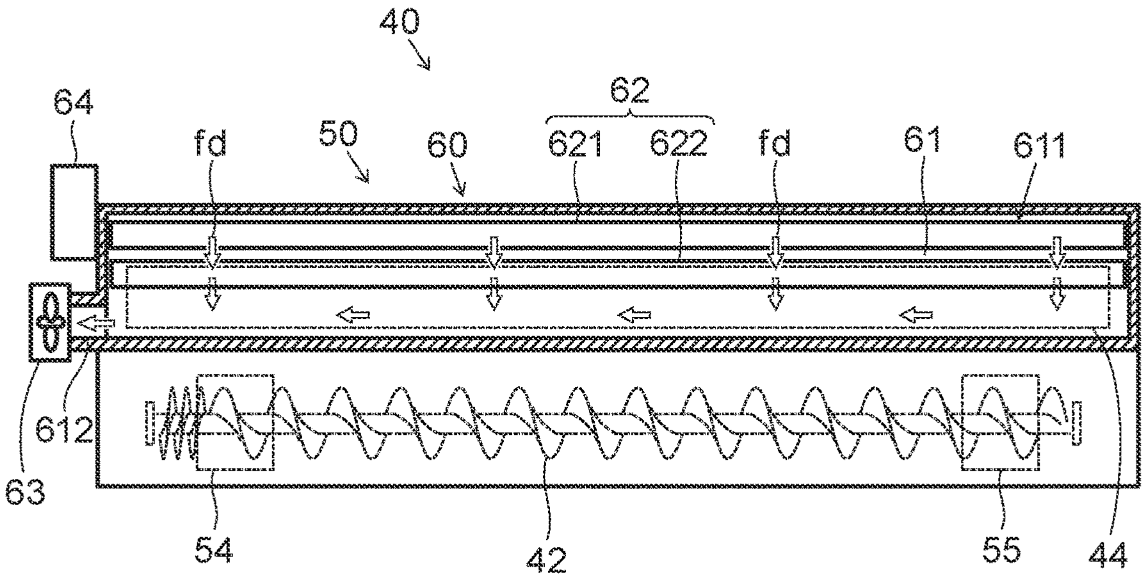
FIG. 6 is a perpendicular cross-sectional side view of the developing device of the image forming section in FIG. 3.

Next, a configuration of the developing device 40 is described with reference not only to FIG. 2 and FIG. 3, but also to FIG. 4, FIG. 5, and FIG. 6. FIG. 4, FIG. 5, and FIG. 6 are respectively a perpendicular cross-sectional front view, a horizontal cross-sectional plan view, and a perpendicular cross-sectional side view of the developing device 40 of the image forming section 20 in FIG. 3. Note that, the developing devices 40 corresponding respectively to the colors basically have the same configuration, and hence the identification symbols that respectively represent the colors are not added to the components, and redundant description thereof is omitted. In addition, in the following description, an "axial direction" refers to a direction of a rotation axis of each of the photosensitive drum 21, a first conveying member 42, a second conveying member 43, and the developing roller 44 that are extend parallel to each other (depth direction in the drawing sheets of FIG. 3 and FIG. 4, that is, right-and-left lateral direction in FIG. 5 and FIG. 6).

The developing device 40 supplies the toner onto the outer peripheral surface of the photosensitive drum 21. The developing device 40 is attachable to and detachable from, for example, the body 2 of the image forming apparatus 1. The developing device 40 includes a developing container 50, the first conveying member (developer conveying member) 42, the second conveying member (developer conveying member) 43, the developing roller (developer carrying member) 44, and a regulating member 45.

The developing container 50 has an elongated shape that extends along the axial direction of the photosensitive drum 21, and is arranged to be horizontal in its longitudinal direction. In other words, the longitudinal direction of the developing container 50 is parallel to the axial direction of the photosensitive drum 21. As developer that contains the toner to be supplied to the photosensitive drum 21, the developing container 50 contains, for example, two-component developer that contains the toner and magnetic carrier. The developer may be, for example, magnetic one-component developer that contains magnetic toner, or non-magnetic one-component developer.

The developing container 50 includes a partition portion 51, a first conveying chamber 52, a second conveying chamber 53, a first communication portion 54, and a second communication portion 55.

The partition portion 51 is provided at a lower portion in an inside of the developing container 50. The partition portion 51 is arranged at a substantially central portion in a direction that intersects with the longitudinal direction of the developing container 50 (right-and-left lateral direction in FIG. 4, that is, upper-and-lower direction in FIG. 5). The partition portion 51 is formed into a substantially plate-like shape that extends in the longitudinal direction and an upper-and-lower direction of the developing container 50. The partition portion 51 divides the inside of the developing container 50 in the direction that intersects with the longitudinal direction.

The first conveying chamber 52 and the second conveying chamber 53 are provided in the developing container 50. The first conveying chamber 52 and the second conveying chamber 53 are formed by the division of the inside of the developing container 50 by the partition portion 51. The first conveying chamber 52 and the second conveying chamber 53 are arranged parallel to each other at substantially the same height.

The second conveying chamber 53 is arranged below and adjacent to an area where the developing roller 44 is arranged among areas in the developing container 50. The first conveying chamber 52 is arranged in an area that is farther from the developing roller 44 than the second conveying chamber 53 is far among the areas in the developing container 50. A developer replenishing tube (not shown) is connected to the first conveying chamber 52, and the developer is replenished through this developer replenishing tube. In the first conveying chamber 52, the first conveying member 42 conveys the developer in a first direction f1. In the second conveying chamber 53, the second conveying member 43 conveys the developer in a second direction f2 that is opposite to the first direction f1.

The first communication portion 54 and the second communication portion 55 are arranged respectively on outsides of both end portions in a longitudinal direction of the partition portion 51. The first communication portion 54 and the second communication portion 55 allow the first conveying chamber 52 and the second conveying chamber 53 to communicate with each other in a direction that intersects with the longitudinal direction of the partition portion 51 (the right-and-left lateral direction in FIG. 4, that is, the upper-and-lower direction in FIG. 5), that is, in a thickness direction of the partition portion 51 having the substantially plate-like shape. In other words, the first communication portion 54 and the second communication portion 55 allow the first conveying chamber 52 and the second conveying chamber 53 to communicate with each other on sides where both end portions in longitudinal directions of the first conveying chamber 52 and the second conveying chamber 53 are present.

The first communication portion 54 allows a downstream end in the first direction f1 of the first conveying chamber 52 and an upstream end in the second direction f2 of the second conveying chamber 53 to communicate with each other. Through the first communication portion 54, the developer is conveyed from a side where the first conveying chamber 52 is present to a side where the second conveying chamber 53 is present. The second communication portion 55 allows a downstream end in the second direction f2 of the second conveying chamber 53 and an upstream end in the first direction f1 of the first conveying chamber 52 to communicate with each other. Through the second communication portion 55, the developer is conveyed from the side where the second conveying chamber 53 is present to the side where the first conveying chamber 52 is present.

The first conveying member 42 is arranged in the first conveying chamber 52. The second conveying chamber 53 is arranged in the second conveying chamber 53. The second conveying member 43 extends near and parallel to the developing roller 44. The first conveying member 42 and the second conveying member 43 are supported in the developing container 50 in a manner that allows the first conveying member 42 and the second conveying member 43 to rotate about their axes that extend in the horizontal direction and parallel to the developing roller 44. The first conveying member 42 and the second conveying member 43 basically have the same configuration including a helical blade that is provided to an outer peripheral portion of a rotary shaft which extends along the longitudinal direction of the developing container 50.

In the first conveying chamber 52, the first conveying member 42 stirs and conveys the developer along the direction of the rotation axis, that is, in the first direction f1 from a side where the second communication portion 55 is present to a side where the first communication portion 54 is present. In the second conveying chamber 53, the second conveying member 43 stirs and conveys the developer along the direction of the rotation axis, that is, in the second direction f2 from the side where the first communication portion 54 is present to the side where the second communication portion 55 is present. In other words, the first conveying member 42 and the second conveying member 43 circulate the developer in a predetermined circulating direction by stirring and conveying the developer in directions opposite to each other.

In the developing container 50, the developing roller 44 is located above the second conveying member 43, and is arranged to face the photosensitive drum 21. The developing roller 44 is supported in the developing container 50 in a manner that allows the developing roller 44 to rotate about its axis that extends in the horizontal direction and parallel to an axis of the photosensitive drum 21. The developing roller 44 includes a cylindrical developing sleeve 441 that rotates, for example, counterclockwise in FIG. 3 and FIG. 4, and a fixed magnet 442 that is fixed in the developing sleeve 441 in a manner that does not allow the fixed magnet 442 to rotate (refer to FIG. 4).

A part of an outer peripheral surface of the developing roller 44 is exposed out of the developing container 50, and faces close to the photosensitive drum 21. The developing roller 44 carries, on its outer peripheral surface, the toner to be supplied onto the outer peripheral surface of the photosensitive drum 21 in an area where the developing roller 44 faces the photosensitive drum 21. The developing roller 44 carries and supplies the toner in the second conveying chamber 53 of the developing container 50 onto the photosensitive drum 21. In other words, the developing roller 44 causes the toner in the second conveying chamber 53 to adhere to the electrostatic latent image on the outer peripheral surface of the photosensitive drum 21, thereby forming the toner image.

The regulating member 45 is arranged on an upstream side in a rotation direction of the developing roller 44 in the area where the developing roller 44 and the photosensitive drum 21 face each other. The regulating member 45 is arranged to be face close to the developing roller 44 with a predetermined clearance between its distal end and the outer peripheral surface of the developing roller 44. The regulating member 45 extends all over the axial direction of the developing roller 44. The regulating member 45 regulates a layer thickness of the developer (toner) that is carried on the outer peripheral surface of the developing roller 44 and that passes through the gap between the distal end of the regulating member 45 and the outer peripheral surface of the developing roller 44.

The first conveying member 42 and the second conveying member 43 are rotated to cause the developer in the developing container 50 to circulate in the predetermined circulating direction through the first communication portion 54 and the second communication portion 55 between the first conveying chamber 52 and the second conveying chamber 53. At this time, the toner in the developing container 50 is electrically charged by being stirred, and then carried on the outer peripheral surface of the developing roller 44. The layer thickness of the toner carried on the outer peripheral surface of the developing roller 44 is regulated by the regulating member 45, and then the toner itself is conveyed by the rotation of the developing roller 44 to the area where the developing roller 44 and the photosensitive drum 21 face each other. The application of the predetermined developing voltage to the developing roller 44 causes a difference between a potential of the outer peripheral surface of the developing roller 44 and the potential of a surface (the outer peripheral surface) of the photosensitive drum 21. With this, the toner carried on the outer peripheral surface of the developing roller 44 is moved to the outer peripheral surface of the photosensitive drum 21 in the facing area. In this way, the electrostatic latent image on the outer peripheral surface of the photosensitive drum 21 is developed by the toner.

Next, the configuration of the developing device 40 is described in more detail with reference to FIG. 4, FIG. 5, and FIG. 6. Note that, arrows indicating an air-flow direction fd in a duct 61 are shown in FIG. 4 and FIG. 6.

The developing device 40 includes a toner trapping mechanism 60. The toner trapping mechanism 60 includes the duct 61, a filter 62, and an exhaust fan 63, and a vibration generating unit 64. The filter 62 includes a first filter 621 and a second filter 622.

The duct 61 is arranged adjacent to the second conveying chamber 53. In the direction that intersects with the longitudinal direction of the developing container 50 (right-and-left lateral direction in FIG. 4, that is, a depth direction in the drawing sheet of FIG. 6), the duct 61 faces the photosensitive drum 21 across the area where the developing roller 44 is arranged among the areas in the developing container 50. An upstream end in the air-flow direction fd of the duct 61 is connected to the second conveying chamber 53. The duct 61 allows air in the second conveying chamber 53 to flow therethrough. The duct 61 includes an intake port 611 and an exhaust port 612.

The intake port 611 is arranged at a portion where the duct 61 and the second conveying chamber 53 are connected to each other above the developing roller 44. In other words, the intake port 611 is located at the upstream end in the air-flow direction fd of the duct 61. The intake port 611 is opened all over the longitudinal direction of the second conveying chamber 53. The intake port 611 is formed, for example, into a rectangular shape that extends in the longitudinal direction of the second conveying chamber 53, and faces the developing roller 44. The intake port 611 allows an inside of the second conveying chamber 53 and an inside of the duct 61 to communicate with each other. The air in the second conveying chamber 53 flows into the duct 61 through the intake port 611.

The exhaust port 612 is arranged, for example, at a back of the developing container 50. The exhaust port 612 is located at a downstream end in the air-flow direction fd of the duct 61. The air in the second conveying chamber 53 is exhausted from the inside of the duct 61 through the exhaust port 612. Note that, the exhaust port 612 of the duct 61 may be connected to another exhaust path that is provided in the body 2 and that includes a fan.

The exhaust fan 63 is connected to the exhaust port 612. When the exhaust fan 63 is driven, the air in the second conveying chamber 53 is forcibly discharged to an outside through the duct 61. In other words, the exhaust fan 63 causes the air in the second conveying chamber 53 to flow out to the outside through the duct 61.

The first filter 621 is arranged at a part corresponding to the intake port 611 being the portion where the duct 61 and the second conveying chamber 53 are connected to each other. The first filter 621 is formed, for example, into the same shape as that of the intake port 611, that is, the rectangular shape that extends in the longitudinal direction of the second conveying chamber 53. The first filter 621 covers the intake port 611. In other words, the first filter 621 faces the developing roller 44. The first filter 621 is made, for example, of nonwoven fabric, and traps the toner that is contained in the air which flows from the second conveying chamber 53 into the duct 61.

The second filter 622 is arranged on a downstream side relative to the first filter 621 in the air-flow direction fd in the duct 61. The second filter 622 is formed into the same shape as that of a cross-section in a direction that intersects with the air-flow direction fd in the duct 61, that is, the rectangular shape that extends in the longitudinal direction of the second conveying chamber 53. The second filter 622 covers a cross-section of the air-flow in the duct 61. The second filter 622 is made, for example, of nonwoven fabric, and traps the toner that is contained in the air which flows in the duct 61 through the first filter 621.

TABLE 1

| | Pressure Drop [mmAq] |
|---|---|
| First Filter | 0.42 |
| Second Filter | 4.50 |

Table 1 shows an example of performance of the first filter 621 and the second filter 622. When upstream static pressure and downstream static pressure were measured at an air-flow rate of 10 cm/s, the first filter 621 caused a pressure drop of 0.42 mmAq, and the second filter 622 caused a pressure drop of 4.50 mmAq. In addition, the second filter 622 was higher, for example, in both 0.3-μm trapping rate and 8-μm trapping rate than the first filter 621.

By the above-described configuration of the filter 62, the first filter 621 is configured to be incapable of trapping the toner in the second conveying chamber 53 by a large amount, that is, configured to be prevented from being clogged. In addition, the second filter 622 can prevent the toner from leaking to an outside of the developing container 50.

The vibration generating unit 64 is arranged, for example, adjacent to a back surface of the developing container 50. The vibration generating unit 64 includes a vibration motor, a control board, and other electronic circuits and electronic components (none of which is shown). An oscillating weight with its center of gravity off-center from a rotation axis of an output shaft of the vibration motor is attached to the output shaft.

The vibration generating unit 64 is connected to the first filter 621. When the vibrating motor is driven, the vibration generating unit 64 vibrates the first filter 621. By causing the vibration generating unit 64 to vibrate the first filter 621, the toner trapped by and adhering to the first filter 621 can be dropped. With this, performance of the first filter 621 can be restored, and toner scattering in the image forming apparatus 1 can be continuously suppressed.

Figure 7:
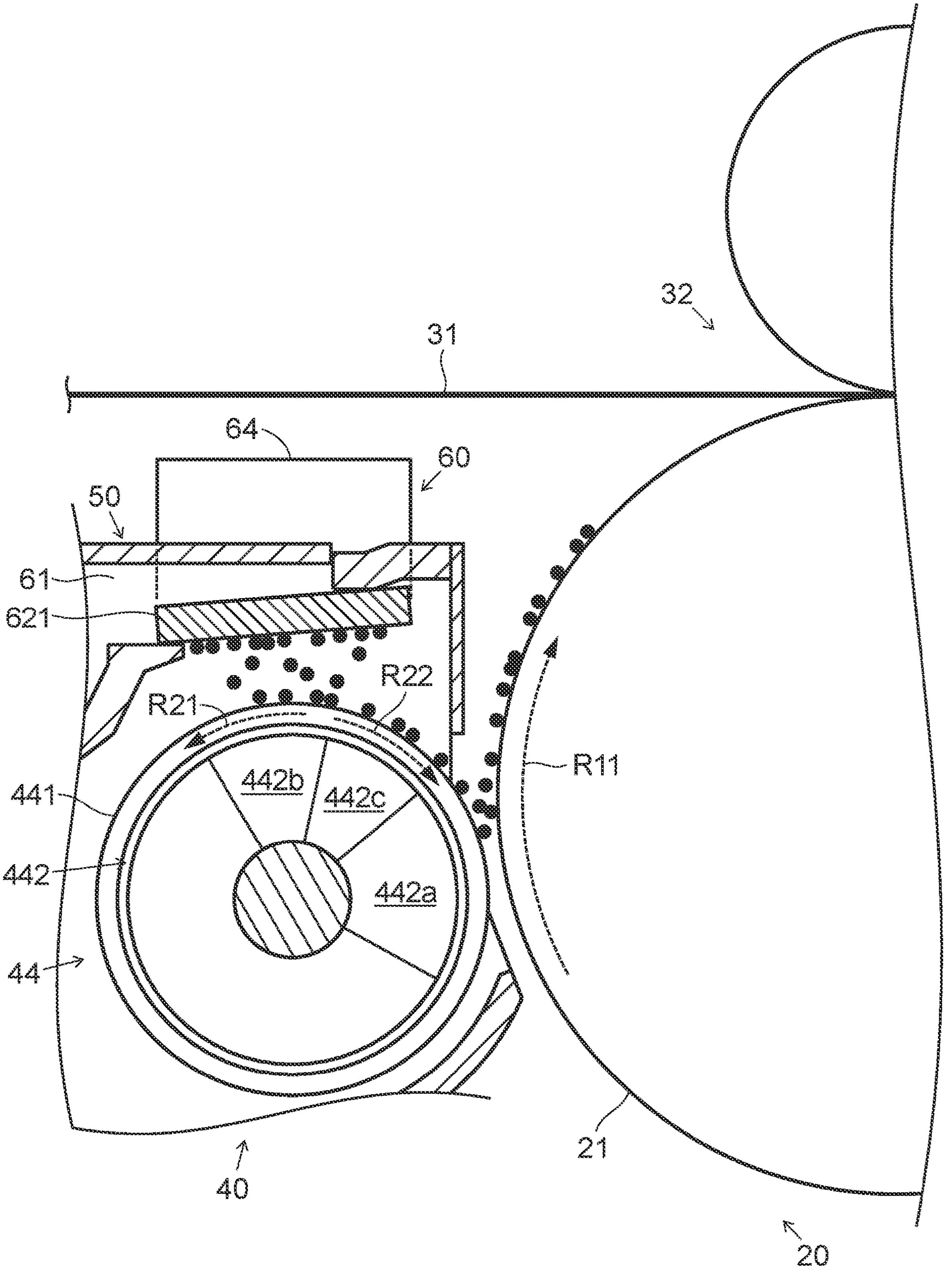
FIG. 7 is a partially enlarged cross-sectional front view of the vicinity of the image forming section in FIG. 3, that is, an explanatory view of a scattered-toner recovery mode.

In this context, the control section 8 of the image forming apparatus 1 is capable of carrying out a scattered-toner recovery mode in which the toner trapped by the first filter 621 is recovered by the drum cleaning unit 23. FIG. 7 is a partially enlarged cross-sectional front view of the vicinity of the image forming section 20 in FIG. 3, that is, an explanatory view of the scattered-toner recovery mode.

Note that, arrows indicating a rotation direction R11 of the photosensitive drum 21 at the time of the image formation, a rotation direction R21 of the developing roller 44 at the time of the image formation, and a rotation direction R22 of the developing roller 44 in the scattered-toner recovery mode are shown in FIG. 7. The rotation direction R21 and the rotation direction R22 of the developing roller 44 are reverse to each other. In addition, for the sake of convenience of description, below the first filter 621 in FIG. 7, the toner dropped from the first filter 621 is depicted as particles (solid circles) on the outer peripheral surface of the developing roller 44 and the outer peripheral surface of the photosensitive drum 21. However, actual toner particles are significantly smaller than the toner particles (solid circles) depicted in FIG. 7.

In the scattered-toner recovery mode, while the image formation is not performed, the control section 8 causes the vibration generating unit 64 to vibrate the first filter 621. In addition, the control section 8 causes the charging unit 22 and the voltage application section 12 to cause the potential difference in a direction in which the toner is moved from the developing roller 44 to the photosensitive drum 21, causes the developing roller 44 to rotate in the direction reverse to that at the time of the image formation (rotation direction R22 in FIG. 7), and causes the photosensitive drum 21 to rotate in the same direction as that at the time of the image formation (rotation direction R11 in FIG. 7). With this, in the scattered-toner recovery mode, the scattered toner dropped from the first filter 621 and adhering to the outer peripheral surface of the developing roller 44 can be recovered by the drum cleaning unit 23 through intermediation of the photosensitive drum 21. Note that, in the scattered-toner recovery mode, transfer bias is not applied at the primary transfer unit 32 so that the toner adhering to the outer peripheral surface of the photosensitive drum 21 is not moved from the photosensitive drum 21 to the intermediate transfer belt 31.

In addition, as illustrated in FIG. 7, the developing roller 44 includes the developing sleeve 441 and the fixed magnet 442.

The developing sleeve 441 has a hollow cylindrical shape that extends along the axial direction of the developing roller 44, and is supported in the developing container 50 in a manner that allows the developing sleeve 441 to rotate. The developing sleeve 441 carries the developer on its outer peripheral surface.

The fixed magnet 442 has a columnar shape that extends along the axial direction of the developing roller 44, and is fixed in the developing sleeve 441 in the manner that does not allow the fixed magnet 442 to rotate. The fixed magnet 442 extends all over the developing sleeve 441 along the axial direction.

The fixed magnet 442 has a plurality of magnetic poles that are arrayed in a circumferential direction of the developing sleeve 441. The fixed magnet 442 has, as the plurality of these magnetic poles, a first pole 442*a*, a second pole 442*b*, and an intermediate pole 442*c*. These magnetic poles are arrayed in an order of the first pole 442*a*, the intermediate pole 442*c*, and the second pole 442*b* along the rotation direction R21 of the developing sleeve 441 at the time of the image formation. Note that, the fixed magnet 442 has other magnetic poles.

The first pole 442*a* is arranged in the area where the developing roller 44 faces the photosensitive drum 21 in the rotation direction R21 of the developing sleeve 441 at the time of the image formation. For example, the first pole 442*a* generates peak magnetic force in an area where the developing roller 44 and the photosensitive drum 21 come closest to each other. The first pole 442*a* causes, with its magnetic force, the developer to be carried on the outer peripheral surface of the developing sleeve 441, and causes only the toner to be splashed to the photosensitive drum 21 by the application of the developing voltage. With this, the electrostatic latent image on the outer peripheral surface of the photosensitive drum 21 is developed.

The second pole 442*b* is arranged in an area where the developing roller 44 faces the first filter 621 in the rotation direction R21 of the developing sleeve 441 at the time of the image formation. In other words, the second pole 442*b* is arranged on a downstream side relative to the first pole 442*a* in the rotation direction R21 of the developing sleeve 441 at the time of the image formation. The developer is carried on the outer peripheral surface of the developing sleeve 441 by magnetic force of the second pole 442*b*, and is conveyed in the direction of the rotation of the developing sleeve 441 along with this rotation.

Note that, the first pole 442*a* and the second pole 442*b* have the same polarity.

The intermediate pole 442*c* is arranged between the first pole 442*a* and the second pole 442*b* in the rotation direction R21 of the developing sleeve 441 at the time of the image formation. Specifically, the intermediate pole 442*c* is arranged on the downstream side relative to the first pole 442*a* and on an upstream side relative to the second pole 442*b* in the rotation direction R21 of the developing sleeve 441 at the time of the image formation. The developer is carried on the outer peripheral surface of the developing sleeve 441 by magnetic force of the intermediate pole 442*c*, and is conveyed in the direction of the rotation of the developing sleeve 441 along with this rotation.

There are no problems as long as the intermediate pole 442*c* to be arranged includes an at least one intermediate pole 442*c*, and a plurality of intermediate poles 442*c* may be arranged. Note that, when the plurality of intermediate poles 442*c* are arranged, among the plurality of these intermediate poles 442*c*, one intermediate pole 442*c* and another intermediate pole 442*c* that are adjacent respectively to the first pole 442*a* and the second pole 442*b* need to have polarities opposite to those of the first pole 442*a* and the second pole 442*b*. At the same time, in order that polarities of adjacent ones of the intermediate poles 442*c* are opposite to each other, the intermediate pole 442*c* to be arranged includes an odd number of intermediate poles 442*c*. In this embodiment, one intermediate pole 442*c* that has a polarity opposite to those of the first pole 442*a* and the second pole 442*b* is arranged.

EXAMPLE

Next, rating of the recovery of the scattered toner in the image forming apparatus 1 is described. In this rating, an image corresponding to a coverage rate of 20% was printed onto 100,000 sheets S, and then efficiency of the recovery of the scattered toner in the image forming apparatus 1 was checked. Note that, a 1st sheet S to a 70,000th sheet S were printed in a normal-temperature and normal-humidity environment (24° C. and 40%), and a 70,001st sheet S to a 100,000th sheet S were printed in a high-temperature and high-humidity environment (28° C. and 80%).

In addition, in this rating, the scattered-toner recovery mode was carried out every time 4,000 sheets S were printed. Specifically, every time 4,000 sheets S were printed, the vibration generating unit 64 was operated, and the developing roller 44 was reversely rotated. At this time, the developing voltage was set to 150V, and the surface potential of the photosensitive drum 21 was set to 20V.

Table 2 shows arrangements of the magnetic poles of the fixed magnet 442. As shown in Table 2, in this rating, the image forming apparatus 1 according to Example of the present disclosure, and an image forming apparatus according to Comparative Example were prepared, the two image-forming apparatuses being different from each other in the arrangement of the magnetic poles of the fixed magnet 442.

TABLE 2

| Arrangement of Magnetic Pole | Example Angle [degree] | Comparative Example Angle [degree] |
|---|---|---|
| First Pole | 0 (N-pole) | 0 (N-pole) |
| Intermediate Pole | 46 (S-pole) | N/A |
| Second Pole | 82 (N-pole) | 80 (S-pole) |

As shown in Table 2, a position of the peak magnetic force of the first pole 442*a* (N-pole) of the fixed magnet 442, the first pole 442*a* being arranged in the area where the developing roller 44 faced the photosensitive drum 21, was a position at an angle of 0 degrees (reference position) both in Example and Comparative Example. Meanwhile, in Example, a position of peak magnetic force of the intermediate pole 442*c* (S-pole) of the fixed magnet 442 was a position at an angle of 46 degrees in the rotation direction R21 of the developing sleeve 441 at the time of the image formation. Meanwhile, in Comparative Example, the fixed magnet 442 did not include the intermediate pole 442*c*. In addition, in Example, a position of peak magnetic force of the second pole 442*b* (N-pole) of the fixed magnet 442 was a position at an angle of 82 degrees in the rotation direction R21 of the developing sleeve 441 at the time of the image formation. In Comparative Example, the position of the peak magnetic force of the second pole 442*b* (S-pole) of the fixed magnet 442 was a position at an angle of 80 degrees in the rotation direction R21 of the developing sleeve 441 at the time of the image formation. Table 3 shows results of the rating.

TABLE 3

| | Example | Comparative Example |
|---|---|---|
| First-Filter Toner Trapping Amount [g] | 0.98 | 1.02 |
| On-Drum Toner Adhesion Amount [g] | 0.88 | 0.63 |
| Scattered-Toner Recovery Efficiency | 0.90 | 0.62 |

As the "First-Filter Toner Trapping Amount" in Table 3, an amount of the toner that had dropped from the first filter 621 was calculated by measuring weight of the first filter 621 before and after the first filter 621 had been vibrated using the vibration generating unit 64 under the state in which the toner had adhered to the first filter 621. As the "On-Drum Toner Adhesion Amount," an amount of the toner that had remained adhered to the outer peripheral surface of the photosensitive drum 21 even after the reverse rotation of the developing roller was measured. Then, the "Scattered-Toner Recovery Efficiency" was calculated as a percentage of the "On-Drum Toner Adhesion Amount" relative to "First-Filter Toner Trapping Amount." In this way, the rating was carried out.

As shown in Table 3, the "Scattered-Toner Recovery Efficiency" was 62% in the image forming apparatus according to Comparative Example. In contrast, the "Scattered-Toner Recovery Efficiency" was 90% in the image forming apparatus 1 according to Example of the present disclosure. In other words, Table 3 demonstrates that the image forming apparatus 1 according to Example of the present disclosure successfully recovered the scattered toner approximately 30% more efficiently than the image forming apparatus according to Comparative Example.

In such a way, in the configuration according to this embodiment, the toner trapping mechanism 60 for sucking and trapping the scattered toner is formed in the developing device 40, and the scattered toner trapped by the filter 62 can be recovered using the drum cleaning unit 23 through intermediation of the developing roller 44 and the photosensitive drum 21.

Note that, when the scattered toner drops onto magnetic brushes that are formed like ears of the developer on the outer peripheral surface of the developing roller 44, the scattered toner does not necessarily adhere to a vicinity of distal ends of the magnetic brushes. Instead, the scattered toner may enter gaps between the magnetic brushes, and then adhere to the outer peripheral surface of the developing roller 44. In this state, the scattered toner is hindered from being moved to the photosensitive drum 21, which deteriorates the scattered-toner recovery efficiency. The scattered toner is preferred to have already adhered to the vicinity of the distal ends of the magnetic brushes by being moved along with the reverse rotation of the developing roller 44 by a time when the scattered toner reaches the area where the developing roller 44 faces the photosensitive drum 21.

Thus, in the configuration according to this embodiment, in the fixed magnet 442 of the developing roller 44, for example, the one intermediate pole 442*c* (S-pole) is arranged between the first pole 442*a* (N-pole, for example) that faces the photosensitive drum 21 and the second pole 442*b* (N-pole) that faces the first filter 621.

With this, when the developing roller 44 is reversely rotated, the magnetic pole on the outer peripheral surface of the developing roller 44 switches in an order of the second pole 442*b* (N-pole) that faces the first filter 621, the intermediate pole 442*c* (S-pole), and the first pole 442*a* (N-pole) that faces the photosensitive drum 21. With the ears maintained in shape, the magnetic brushes are rotated on the outer peripheral surface of the developing roller 44 while moved onto adjacent ones of the magnetic poles in the circumferential direction. In other words, even if the scattered toner dropped onto the magnetic brushes in a vicinity of the second pole 442*b* (N-pole) enters the gaps between the magnetic brushes, and then adheres to the outer peripheral surface of the developing roller 44, when the magnetic brushes are moved onto the first pole 442*a* (N-pole) past the intermediate pole 442*c* (S-pole), the scattered toner is conveyed to the vicinity of the distal ends of the magnetic brushes by the rotation of the magnetic brushes.

As a result, when the scattered toner moved along with the reverse rotation of the developing roller 44 reaches the area where the developing roller 44 faces the photosensitive drum 21, the scattered toner easily comes close to the outer peripheral surface of the photosensitive drum 21, and then is easily moved to the photosensitive drum 21. In other words, the scattered toner can be efficiently recovered through intermediation of the photosensitive drum 21. Thus, with a downsized configuration, the toner scattering in the image forming apparatus 1 can be suppressed.

Note that, as described above, the one intermediate pole 442*c* is arranged. Thus, with a simple configuration, the scattered toner is easily brought close to the outer peripheral surface of the photosensitive drum 21 when the scattered toner moved along with the reverse rotation of the developing roller 44 reaches the area where the developing roller 44 faces the photosensitive drum 21. In other words, the scattered toner can be further efficiently recovered.

Yet further, the control section 8 carries out the scattered-toner recovery mode every time a predetermined number of sheets are printed. For example, in the image forming apparatus 1 according to Example, the control section 8 carried out the scattered-toner recovery mode every time 4,000 sheets were printed. This configuration enables the scattered toner trapped by the filter 62 to be regularly recovered using the drum cleaning unit 23 through intermediation of the developing roller 44 and the photosensitive drum 21. Thus, effect of suppressing the toner scattering in the image forming apparatus 1 can be enhanced.

Yet further, the developer to be used for forming the toner images is the two-component developer that contains the magnetic carrier and the toner. The two-component developer is known for its liability to cause the toner scattering from the developing container 50. Thus, by carrying out the above-described scattered-toner recovery mode in the image forming apparatus 1 that uses the two-component developer, the toner scattering in the image forming apparatus 1 can be further effectively suppressed.

Yet further, the photosensitive drum 21 has, on its outer peripheral surface, the photosensitive layer formed of the amorphous-silicon photosensitive member. The photosensitive layer formed of the amorphous-silicon photosensitive member is known for its high dielectric constant and small toner-charge amount. The small toner-charge amount is liable to cause the toner scattering from the developing container 50. Thus, by carrying out the above-described scattered-toner recovery mode in the image forming apparatus 1 that uses the photosensitive drum 21 including the amorphous-silicon photosensitive member, the toner scattering in the image forming apparatus 1 can be further effectively suppressed.

The scope of the present disclosure is not limited to the above-described embodiment of the present disclosure, and may be embodied with various modifications without departing from the gist of the present disclosure.

For example, the image forming apparatus 1 according to the above-described embodiment is not limited to the image forming apparatus for color printing and of what is called a tandem type that forms images by sequentially superimposing images in a plurality of colors. The image forming apparatus may be an image forming apparatus for color printing and of a non-tandem type, or may be an image forming apparatus for monochromatic printing.

What is claimed is:

1. An image forming apparatus, comprising:
an image bearing member that has an outer peripheral surface on which an electrostatic latent image is formed;
a charging unit that is configured to charge the outer peripheral surface of the image bearing member;
a cleaning unit that is configured to clean the outer peripheral surface of the image bearing member;
a developing device including
a developing container that is configured to contain developer which contains toner to be supplied to the image bearing member,
a developer conveying member
that is supported in a conveying chamber of the developing container in a manner that allows the developer conveying member to rotate, and
that is configured to circulate the developer by stirring and conveying the developer, and
a developer carrying member
that is supported in the developing container in a manner that allows the developer carrying member to rotate while the developer carrying member faces the image bearing member, and
that is configured to supply the toner in the conveying chamber to the image bearing member;
a voltage application section that is configured to apply developing voltage to the developer carrying member; and
a control section that is configured to control
the image bearing member,
the charging unit,
the cleaning unit,
the developing device, and
the voltage application section,
the developing device including
a toner trapping mechanism which includes
a duct
that is connected to the conveying chamber, and
that is configured to allow air in the conveying chamber to flow through the duct,
a filter
that is arranged at a portion where the duct and the conveying chamber are connected to each other above the developer carrying member, and
that is configured to trap the toner which flows from the conveying chamber into the duct,
an exhaust fan that is configured to cause the air in the conveying chamber to flow out to an outside through the duct, and
a vibration generating unit that is configured to vibrate the filter,
the control section being capable of carrying out a scattered-toner recovery mode in which, while image formation is prevented from being performed, scattered toner that has dropped from the filter and adhered to an outer peripheral surface of the developer carrying member is recovered by the cleaning unit through intermediation of the image bearing member
by causing, by the control section, the vibration generating unit to vibrate the filter,
by causing, by the control section, the charging unit and the voltage application section to cause a potential difference in a direction in which the toner is moved from the developer carrying member to the image bearing member,
by causing, by the control section, the developer carrying member to rotate in a direction reverse to a direction at a time of the image formation, and
by causing, by the control section, the image bearing member to rotate in a same direction as a direction at the time of the image formation,
the developer carrying member including
a developing sleeve
that has a hollow cylindrical shape,
that is rotatable, and
that is configured to carry the developer on an outer peripheral surface of the developing sleeve,
a fixed magnet
that is fixed in the developing sleeve in a manner that prevents the fixed magnet from rotating, and
that has a plurality of magnetic poles which are arrayed along a circumferential direction of the developing sleeve,
the plurality of magnetic poles including, in the rotation direction of the developing sleeve,
a first pole that is arranged in an area where the developer carrying member faces the image bearing member, a second pole that is arranged in an area where the developer carrying member faces the filter, and an at least one intermediate pole that is arranged between the first pole and the second pole, the first pole and the second pole having a same polarity, the at least one intermediate pole including an odd number of intermediate poles that are arranged in a manner that a polarity of the at least one intermediate pole which is adjacent to the first pole and the second pole is opposite to the same polarity of the first pole and the second pole, and that polarities of the odd number of intermediate poles which are adjacent to each other are opposite to each other.

2. The image forming apparatus according to claim 1, wherein the at least one intermediate pole that is arranged between the first pole and the second pole includes one intermediate pole.

3. The image forming apparatus according to claim 1, wherein the control section carries out the scattered-toner recovery mode every time a predetermined number of sheets are printed.

4. The image forming apparatus according to claim 1, wherein the developer is two-component developer that contains magnetic carrier and the toner.

5. The image forming apparatus according to claim 1, wherein the image bearing member has, on the outer peripheral surface of the image bearing member, a photosensitive layer formed of an amorphous-silicon photosensitive member.

6. The image forming apparatus according to claim 1, wherein the filter includes a first filter that is opened all over a longitudinal direction of the conveying chamber, and that is configured to cover an intake port which is configured to allow an inside of the conveying chamber and an inside of the duct to communicate with each other, and a second filter that is arranged on a downstream side relative to the first filter in an air-flow direction in the duct, and that is configured to cover a cross-section of the air-flow in the duct.

* * * * *